(12) United States Patent
Chmielewski et al.

(10) Patent No.: US 8,442,528 B2
(45) Date of Patent: May 14, 2013

(54) AUTOMATING DIAL ATTEMPTS TO A TELEMATICS OR CELLULAR DEVICE

(75) Inventors: Laura R. Chmielewski, Huntington Woods, MI (US); David A. Holt, Rochester Hills, MI (US); Delano K. Kado, Sterling Heights, MI (US); Jong Seok Baik, Troy, MI (US); Matthew R. Mannikka, Detroit, MI (US); Brian A. Day, Birmingham, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 13/105,534

(22) Filed: May 11, 2011

(65) Prior Publication Data

US 2012/0289166 A1    Nov. 15, 2012

(51) Int. Cl.
*H04W 8/04* (2009.01)
*H04W 60/00* (2009.01)

(52) U.S. Cl.
USPC ......... 455/435.1; 455/450; 455/411; 455/423

(58) Field of Classification Search ........................ None
See application file for complete search history.

(56) References Cited

U.S. PATENT DOCUMENTS

| | | | |
|---|---|---|---|
| 5,355,516 A * | 10/1994 | Herold et al. | 455/510 |
| 2001/0037305 A1* | 11/2001 | Mochizuki | 705/52 |
| 2004/0229612 A1* | 11/2004 | Narayanan et al. | 455/435.1 |
| 2006/0135170 A1* | 6/2006 | Patenaude | 455/450 |
| 2007/0083304 A1* | 4/2007 | Yamada | 701/29 |
| 2009/0012675 A1* | 1/2009 | Laghrari et al. | 701/33 |
| 2010/0075680 A1* | 3/2010 | Ramachandran et al. | 455/436 |
| 2011/0021195 A1* | 1/2011 | Cormier et al. | 455/435.2 |

* cited by examiner

*Primary Examiner* — Marcos Batista
*Assistant Examiner* — Keith Fang
(74) *Attorney, Agent, or Firm* — Anthony Luke Simon; Reising Ethington P.C.

(57) ABSTRACT

A system and method of managing communications with a vehicle telematics unit includes determining that a data transmission to a vehicle telematics unit over a wireless carrier system has failed; automatically performing a network registration check with the wireless carrier system to determine the registration status of the vehicle telematics unit based on the data transmission failure; and deciding whether to re-transmit the data to the vehicle based on the results of the network registration check.

20 Claims, 2 Drawing Sheets

AUTOMATING DIAL ATTEMPTS TO A TELEMATICS OR CELLULAR DEVICE

TECHNICAL FIELD

The present invention relates generally to vehicles and more particularly to techniques for contacting vehicle telematics units that are installed in vehicles.

BACKGROUND OF THE INVENTION

Vehicle manufacturers outfit their vehicles with an increasing number of wireless communications capabilities. Telematics units installed on modern vehicles can wirelessly communicate both voice and data transmissions between the vehicle and a variety of recipients, such as a central facility. Telematics units are usually registered with a cellular service that provides wireless communications services to users of those units. A telematics service provider may wirelessly communicate data between the central facility and a vehicle or vehicle telematics unit using the cellular service. However, the telematics service provider may send requests to communicate with vehicles that are unavailable to communicate for any one of a variety of reasons. To follow up unresponsive communication requests, telematics service providers often resort to sending additional requests. But these additional requests involve increased data costs which, in turn, increases the ultimate cost of communicating with a vehicle. And if the vehicle telematics unit is unable to communicate, the telematics service provider has no way of knowing this. In the meantime, the telematics service provider may continue to incur additional costs by needlessly attempting to communicate with a vehicle that is unable to respond.

SUMMARY OF THE INVENTION

According to an aspect of the invention, there is provided a method of managing communications with a vehicle telematics unit. The steps include determining that a data transmission to a vehicle telematics unit over a wireless carrier system has failed; automatically performing a network registration check with the wireless carrier system to determine the registration status of the vehicle telematics unit based on the data transmission failure; and deciding whether to re-transmit the data to the vehicle based on the results of the network registration check.

According to another aspect of the invention, there is provided a method of managing communications with a vehicle telematics unit. The steps include determining that a vehicle telematics unit cannot receive a data transmission from a central facility; performing a network registration check for the vehicle telematics unit by querying a data cache containing cellular network registrations for vehicle telematics units; and if a network registration check is not pending, then implementing a long-term retry strategy to contact the vehicle telematics unit.

According to yet another aspect of the invention, there is provided a method of managing communications with a vehicle telematics unit. The steps include transmitting data from a central facility to a vehicle over a wireless carrier system; determining that the vehicle is unable to receive the data transmission; performing a network registration check based on the determination that the vehicle is unable to receive the data transmission; identifying a long-term retry strategy for wirelessly contacting the vehicle that includes one or more individual short-term retry strategies; and contacting the vehicle using the identified long-term retry strategy as well as one or more individual short-term retry strategies.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
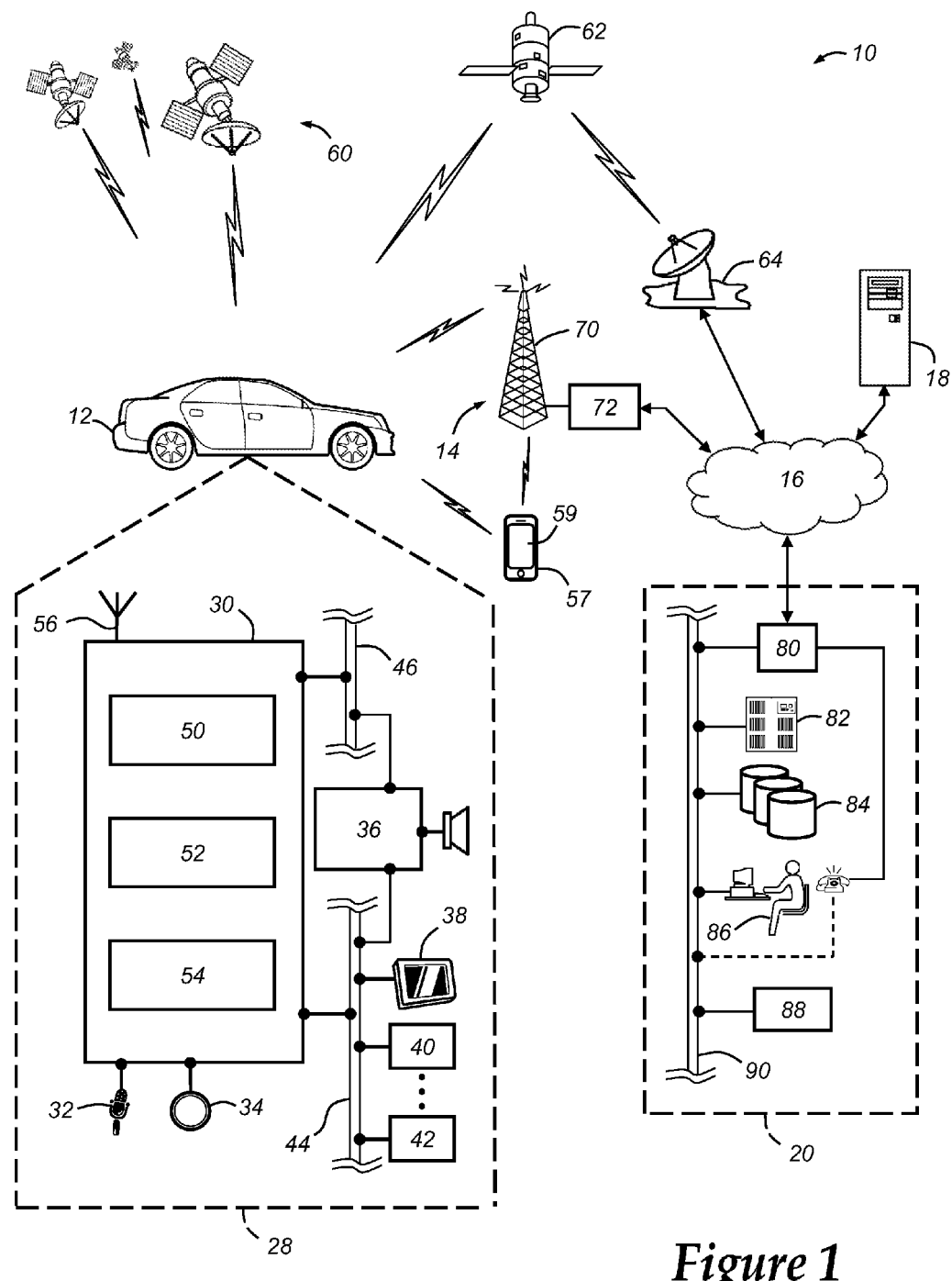
FIG. 1 is a block diagram depicting an exemplary embodiment of a communications system that is capable of using the method disclosed herein.

The system and method described below involves determining the cellular registration status of one or more telematics units and deciding how to communicate with the telematics unit(s) based on the registration status. Telematics subscription services wirelessly communicate voice and data content with vehicles for a variety of reasons. Sometimes, the telematics service provider attempts to contact one or more vehicles which do not respond. However, the telematics service provider may still want to reach those vehicles that did not respond. So the telematics service provider sometimes continues to send communication requests to those vehicles even though the service is not receiving responses from those vehicles. Vehicles may not respond because they have left the service area or have been taken out of service. In these cases as well as others, the vehicles may not be able to respond to communication requests. However, the telematics service provider may desire to know whether vehicle will resume communication soon or not.

In order to better understand the communication status of vehicles, the telematics service provider can determine the cellular registration status of one or more of these non-communicating vehicles by using a network registration check. Generally, the cellular function of the telematics unit registers with a base station operated by the cellular service provider that is associated with the vehicle/telematics unit. The method described herein can include accessing the information contained in the cellular registration and make decisions based on the content of that information. This information can include the last time the telematics unit registered with the cellular provider, whether the telematics unit is presently registered with the cellular provider, if presently registered, when that registration will expire, or the location of the vehicle, to name a few. Also, this information can be obtained by a telematics service provider from the cellular provider and used to make decisions regarding the availability of the vehicle(s). The decisions can define a configurable retry strategy that is used to contact the vehicle(s). In one example, the configurable retry strategy can be as simple as deciding not to contact the vehicle if the telematics unit is not registered and not to attempt contacting the vehicle unless the telematics unit registers with the cellular provider. However, the configurable retry strategy can also be more complex and include both short-term and/or long-term retry strategies. It is possible to establish a customizable algorithm that includes any number of different variables to consider when deciding when (or even if) the telematics service provider will re-try commencing communications with the telematics unit. In one example, the customizable algorithm can determine a schedule for performing registration checks with regard to a particular telematics unit and if the registration check indicates that the telematics unit is online, then re-try commencing communications. By considering the relative probability that the vehicle will be able to respond to the wireless communications sent by the telematics service provider, it is possible to reduce the cost of sending unanswered wireless queries to unavailable vehicles.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions, on-board vehicle diagnostics, and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver.

Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. In one implementation, the computer 18 can use a database that includes cellular registration data and can be accessed to obtain that data. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
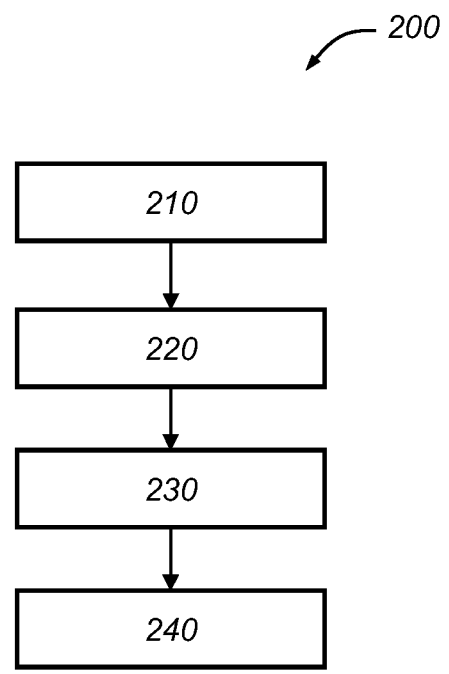
FIG. 2 is a flow chart of a method of managing communications with a vehicle telematics unit.

Turning now to FIG. 2, there is a method 200 of managing communications with a vehicle telematics unit 30. The method 200 begins at step 210 by transmitting data from a central facility, such as call center 20, to the vehicle 12 over the wireless carrier system 14. This can include wirelessly sending a request to communicate, such as a ping, from the call center 20 to the vehicle 12. And the requests to communicate can further involve the transmission of data files, such as software installation packages or other computer-executable commands, to the vehicle 12 over the wireless carrier system 14. It is possible to send these transmissions to a single vehicle 12 or a plurality of vehicles 12. The method 200 proceeds to step 220.

At step 220, it is determined whether the vehicle is unable to receive the data transmission or that the data transmission has failed. Usually, the vehicle 12 can wirelessly respond to the request to communicate using the telematics unit 30 and a communications session between the vehicle 12 and the call center 20 can begin. However, if the vehicle 12 or telematics unit 30 is unable to respond to the request, the call center 20 may not receive any wireless transmission from the vehicle 12 in response to its transmission or request. In that case, the call center 20 can determine that the request sent to one or more vehicles 12 for communication failed for some reason. This determination can be made by beginning a timer or a clock at the time the call center 20 sends the request for communication. The time that has passed since the request for communication was sent by the call center 20 can be compared with a predetermined time threshold beyond which the vehicle 12 or telematics unit 30 can be considered to be non-responsive to such a request. The method 200 proceeds to step 230.

At step 230, a network registration check is performed based on the determination that the vehicle is unable to receive the data transmission. Once it is determined that one or more vehicles 12 are not responding to a request to communicate, then more investigation can be carried out as to the reasons why the vehicle 12 is not responding to the call center 20. The call center 20 can use the information with which it sent the request to communicate to the vehicle 12 to perform a network registration check with respect to the one or more non-responsive vehicles 12. Generally, a network registration check may be performed after the call center 20 has attempted to wirelessly contact the vehicle 12. This can include determining whether a network registration check has been performed for the vehicle telematics unit 30 by querying a data cache containing cellular network registration information for the unit 30. However, it should be appreciated that the network registration check may be performed independent of the determination that the vehicle 12 is unable to receive the data transmission or previous attempts at communicating with the vehicle 12. That is, registration status can be performed before transmitting data from a central facility to the vehicle 12.

When performing a network registration check, the call center 20 can determine if a network registration check has been previously performed and the time and day that the check was performed. The time and day of each network registration check can be stored at the data cache or the call center 20 with a vehicle identifier. That way, the history of network registration checks performed for a particular vehicle 12 can be accessed and in some cases used to determine if another network registration check will be performed.

The history of network registration checks can also indicate to the call center 20 whether the outcome of a network registration check is pending or has been previously carried out. For example, the call center 20 can perform a network registration check for a particular vehicle and record the time and day that the check was performed. Before performing another network registration check, the call center 20 can access the history of network registration checks and compare the recorded time and day with the present time and day. The time that has elapsed from the recorded time and day and the present can then be compared to a predetermined time threshold. If the elapsed time exceeds the predetermined threshold, then it can be determined that the network registration check is stale and a new network registration check can be performed. Otherwise, the network registration check can be deemed still valid and the information generated by such a check considered fresh. The history of network registration checks can be realized by a database that is accessible to the call center 20.

The outcome of a network registration check can indicate that a telematics unit 30 is online, is offline, or has recently become offline. The call center 20 can determine which of these statuses exists depending on the time the telematics unit 30 last registered with the wireless carrier system 14. The call center 20 can measure the last time the telematics unit 30 registered with the system 14 and compare it with one or more predetermined time thresholds. For example, if the present time and day is earlier than a registration expiration date, the call center 20 can determine that the registration of a telematics unit 30 is current and the unit 30 is online. On the other hand, if the time and day the registration expired is earlier than the current time and day, it can be determined that the telematics unit 30 is offline. However, it also can be determined that the present time and day is within a predetermined amount of time from when the registration of a telematics unit expired. In that case, it can be determined that the telematics unit 30 has recently gone offline.

One example of a database containing cellular network registration information is a mobile number management system (MNMS). One or more network registration checks can be sent via wireless carrier system 14 or land network 16 to the MNMS, which can respond to those checks with data that can be used to determine whether or not the telematics unit 30 has recently registered with the wireless carrier system 14. The MNMS can be a centralized database maintained by a cellular provider/wireless carrier system 14 that monitors—among other things—registration information relating to one or more telematics units 30. Before performing the network registration check, the call center 20 may determine the identity of the cellular provider/wireless carrier system 14. The call center 20 may do this in order to ensure that the cellular provider maintains a database, such as the MNMS. The method 200 proceeds to step 240.

At step 240, a long-term retry strategy can be identified for wirelessly contacting the vehicle, which can be contacted using the identified strategy as well as one or more individual short-term retry strategies. Long-term retry strategies can include a plurality of customizable variables relating to a schedule for contacting the vehicle 12 and the manner in which the vehicle 12 or group(s) of vehicles 12 can be contacted over a period of time. For example, a long-term retry strategy can be labeled with a name and/or a code for identifying the strategy. Additionally, the long-term retry strategy can include one or more individual short-term retry strategies, such as one or more tiers, that each specify a plurality of parameters, examples of which include the total number of attempts to contact the vehicle 12 or group(s) of vehicles 12, a counter value that determines the point at which each short-term retry strategy begins, the amount of time delay before beginning the long-term retry strategy, the time delay before successive attempts to contact the vehicle 12, whether or not an additional network registration check should be carried out as a part of contacting the vehicle 12, and/or an expiration period, measured by an amount of time or number of attempts to contact the vehicle 12, beyond which the long-term retry strategy should end.

In an illustrative example, a long-term retry strategy can include three tiers (or three short-term retry strategies) that cascade from a first tier to a last tier. And the long-term retry strategy can include a code to identify the long-term retry strategy. In addition, the long-term retry strategy can include an expiration period beyond which the strategy ends (e.g. 70 days) as well as the total number of attempts that the strategy can permit (e.g. 14 attempts). The first tier can begin with attempt number 1 and specify a one-day delay between attempts to contact the vehicle 12 as well as an instruction to prevent the commencement of a network registration check. If the call center 20 has not successfully established communication with the vehicle 12 after the first seven attempts to do so, the long-term retry strategy can progress to tier 2, which can begin on the eighth attempt to contact the vehicle 12. A wait of two days can precede the commencement of tier 2. After the two-day wait has passed, the call center 20 can make four attempts that are each separated by seven days. In contrast to tier 1, tier 2 may now permit a network registration check. If the vehicle 12 does not respond during tier 2 of the long-term retry strategy, then tier 3 (the last tier) can begin. Tier 3 can include a one-hour delay before beginning. During Tier 3, the call center 20 can perform a network registration check for the vehicle 12 every ten days. If the call center 20 learned from the network registration check that the telematics unit 30 of the vehicle 12 was registered, the call center 20 would attempt to contact the vehicle 12; otherwise, the call center 20 would wait ten days and perform another network registration check. The long-term retry strategy can end after a total of fourteen attempts to contact the vehicle 12 or after 70 days have passed since implementing the long-term retry strategy, whichever occurs first.

The above example of a long-term retry strategy is just one of many different combinations of customizable variables. It should be appreciated that the group of customizable variables can be recursively determined based on the performance of past long-term retry strategies. For each long-term retry strategy used to contact a non-responsive vehicle 12 (or group of vehicles 12), the outcome for each attempt to contact the vehicle 12 can be recorded at the call center 20 or some other central facility. More specifically, the recorded outcome can include various aspects of the long-term retry strategy, such as the number of times the call center 20 attempted to contact the vehicle 12, the times of day the vehicle 12 was contacted, and whether or not the vehicle 12 ultimately responded to the efforts to contact it, to name a few. Using a plurality of recorded outcomes, the call center 20 or central data-processing center can perform recursive analysis to determine more effective long-term retry strategies. The recursive analysis can be carried out using a variety of computing resources, such as computer 18 or database 84. Examples of this recursive action can include analyzing the recorded outcomes to determine the most successful time of day to contact the vehicle 12 or a length of time beyond which the vehicle 12 has not responded to repeated contact attempts. In response to this analysis, long-term retry strategies employed by the method 200 can then be modified to reflect the recursive action, such as by altering the frequency with which contact with the vehicle 12 can be made or limiting the length of time that the long-term retry strategy can operate. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of managing communications with a vehicle telematics unit, comprising the steps of:
   (a) determining that a data transmission to a vehicle telematics unit over a wireless carrier system has failed;
   (b) automatically performing a network registration check with the wireless carrier system to determine the registration status of the vehicle telematics unit based on the data transmission failure; and
   (c) deciding whether to re-transmit the data to the vehicle based on the results of the network registration check.

2. The method of claim 1, wherein determining that the data transmission has failed further comprises the step of determining that the amount of time the vehicle telematics unit takes to respond to a call center is greater than a predetermined threshold.

3. The method of claim 1, further comprising the step of determining if a network registration check for the vehicle telematics unit is currently pending.

4. The method of claim 1, wherein performing the network registration check further comprises the step of querying a data cache maintained by the wireless carrier system.

5. The method of claim 1, wherein the network registration check is performed by sending data to a mobile number management system (MNMS).

6. The method of claim 1, further comprising the step of deciding whether to retransmit data to the vehicle telematics unit based on a history of network registration checks that are stored in a data cache.

7. The method of claim 1, wherein the results of the network registration check are that the vehicle telematics unit is online, is offline, or is recently offline.

8. The method of claim 1, wherein the data is re-transmitted to the vehicle based on a long-term retry strategy that includes two or more short-term retry strategies.

9. A method of managing communications with a vehicle telematics unit, comprising the steps of:
   (a) determining that a vehicle telematics unit cannot receive a data transmission from a central facility;
   (b) performing a network registration check for the vehicle telematics unit by querying a data cache containing cellular network registrations for vehicle telematics units; and
   (c) if a network registration check is not pending, then implementing a long-term retry strategy to contact the vehicle telematics unit.

10. The method of claim 9, wherein determining that the vehicle telematics unit cannot receive a data transmission further comprises the step of determining that the amount of time the vehicle telematics unit takes to respond to a call center is greater than a predetermined threshold.

11. The method of claim 9, wherein performing the network registration check further comprises the step of querying a data cache maintained by the wireless carrier system.

12. The method of claim 9, wherein performing the network registration check includes sending data to a mobile number management system (MNMS).

13. The method of claim 9, wherein the content of the long-term retry strategy to contact the vehicle telematics unit is based on a history of network registration checks that are stored in a data cache.

14. The method of claim 9, wherein the results of the network registration check are that the vehicle telematics unit is online, is offline, or is recently offline.

15. The method of claim 9, wherein the long-term retry strategy includes two or more short-term retry strategies.

16. The method of claim 9, wherein the content of the long-term retry strategy is determined based on recursive analysis of previously-implemented long-term retry strategies.

17. A method of managing communications with a vehicle telematics unit, comprising the steps of:
   (a) transmitting data from a central facility to a vehicle over a wireless carrier system;
   (b) determining that the vehicle is unable to receive the data transmission;
   (c) performing a network registration check based on the determination that the vehicle is unable to receive the data transmission;
   (d) identifying a long-term retry strategy for wirelessly contacting the vehicle that includes one or more individual short-term retry strategies; and
   (e) contacting the vehicle using the identified long-term retry strategy as well as one or more individual short-term retry strategies.

18. The method of claim 17, wherein the content of the long-term retry strategy to contact the vehicle is based on a history of network registration checks that are stored in a data cache.

19. The method of claim 17, wherein the results of the network registration check are that the vehicle telematics unit is online, is offline, or is recently offline.

20. The method of claim 17, wherein the long-term retry strategy is identified based on recursive analysis of previously-implemented long-term retry strategies.

* * * * *